United States Patent [19]
Langheinrich

[11] 3,736,585
[45] May 29, 1973

[54] APPARATUS FOR INDICATION OF MEASURING VALUES

[75] Inventor: Hans Langheinrich, Offenbach/Main, Germany

[73] Assignee: VDO Tachometer Werke, Adolf Schindling GmbH, Frankfurt/Main, Germany

[22] Filed: Feb. 24, 1970

[21] Appl. No.: 13,363

[30] Foreign Application Priority Data

Feb. 22, 1969 Germany..................P 19 09 026.7

[52] U.S. Cl..........340/324 R, 340/166 EL, 340/336, 340/347 AD
[51] Int. Cl..............................................H03k 13/02
[58] Field of Search ..................235/92; 307/321; 340/347, 336, 166 EL, 324 R

[56] References Cited

UNITED STATES PATENTS

| 3,293,416 | 12/1966 | Chisholm | 235/92 |
| 3,327,163 | 6/1967 | Blank | 315/169 |
| 3,622,996 | 11/1971 | Bath | 340/336 |
| 3,280,341 | 10/1966 | DuVall | 340/336 |

FOREIGN PATENTS OR APPLICATIONS

| 227,379 | 6/1969 | U.S.S.R. | 307/321 |

Primary Examiner—Maynard R. Wilbur
Assistant Examiner—Jeremiah Glassman
Attorney—Ernest G. Montague

[57] ABSTRACT

An apparatus for indication of measuring values, which comprises a plurality of luminous cells excitable by means of alternating voltage and disposed in bargraph display succession. An electric switch is provided in form of a rectifier bridge. The luminous cells are disposed in the alternating current path of the rectifier bridge. A one-direction-switching element is also arranged, and the rectifier bridge is capable of being short-circuited by means of the one-direction-switching element.

19 Claims, 7 Drawing Figures

Patented May 29, 1973

INVENTOR
HANS LANGHEINRICH
BY
ATTORNEY.

INVENTOR
HANS LANGHEINRICH
BY
ATTORNEY.

Patented May 29, 1973

INVENTOR
HANS LANGHEINRICH

BY

ATTORNEY.

APPARATUS FOR INDICATION OF MEASURING VALUES

The present invention relates to an apparatus for indication of measuring values, in general, and to such apparatus with a plurality of luminous cells disposed in tape-like i.e., in the form of a bargraph display, succession and excitable by means of alternating voltage, which luminous cells are chargeable by means of electronic switches selectively operable.

It has been proposed before already, in particular in connection with apparatus of this type, to lock the exciting alternating voltage of luminous cells, in one direction only, for instance by a series arrangement of a diode. Now the electro-luminescence elements, particularly suitable for such indications, comprise a condenser with a dielectric, the ohmic resistance of which is comparatively low. In the half period of the alternating voltage, in which the diode is non-penetrable (negative half wave), the "condenser" starts the discharge over its own ohmic resistance. In the following positive half wave, the voltage increases again to its apex value, in order immediately thereafter to lower itself by self-discharge, etc. Thus, in case of an intermediate switching of a diode, likewise an alternating voltage comes into operation, which is though lower than the alternating current flowing in case of light control of the electro-luminescence element, yet however, is sufficient, in order to permit a low lighting of the electro-luminescence element (so-called pre-illumination). Corresponding conditions result also in other luminous cells, for instance luminescence diodes.

It is one object of the present invention, to provide an apparatus for indication of measuring values wherein the undesirable pre-illumination is removed with as few as possible requirement for electrical and electronic parts and causing as low costs as possible, whereby the solution of this problem is rendered more difficult by the fact, that the required exciting alternating voltage can have comparatively high values.

It is another object of the present invention, to provide an apparatus for indication of measuring values, wherein as an electronic switch, a rectifier bridge is used, in the alternating current path of which the luminous cell is disposed and which can be short-circuited by means of a one-direction switching element, in particular a transistor or thyristor disposed in the direct current path. If the one-direction-switching element is operated, the exciting alternating voltage is locked in both directions. The rectifier switch opens in both directions, as soon as the one-direction-switching element is switched on. In spite of the fact that the luminous cell has a flow of alternating current, the voltage is available during those half waves in the right polarity to the one-direction-switching element by the rectifier bridge. The electronic switch designed in accordance with the present invention, permits to lock high voltages in both directions. For its operation only a small power is required.

If now for the operation of the switch, an electrode of the corresponding one-direction-switching element, for instance the emitter of transistors of the electronic switches, to which a plurality of luminous cells are coordinated, is put to a joint potential, for instance connected with mass, connected with ground, upon feeding of one transistor, all other locked transistors are passed over during a half wave of the exciting alternating voltage over this joined connection. This means, that in the dark-controlled luminous cells it comes again to the above described, undesirable pre-illumination. This is omitted and avoided in accordance with a further development of the present invention such, that the connection of the one-direction-switching element takes place over a transformer free of potential.

Since transformers as a matter of course transmit only alternating voltages, the alternating voltage used for connection is rectified on a secondary side and smoothed, when the one-direction-switching element should be fed with direct voltage. It has been found, however, that the circuit can be simplified and the requirements for the circuit can be reduced, by feeding the transformer with a high frequency connecting voltage and its secondary winding is connected directly with the control electrode of the one-direction-switching element.

The one-direction-switching element is then continuously alternately conducting and non-conducting. Since the luminous cell constitutes, however, a capacitive load, the voltage remains intact in the same moment of the locking, when the feeding signal has a sufficiently high frequency.

If each of the luminous cells is chargeable, by means of its own electronic switch of the type of the present invention, wi an exciting alternating voltage, the number of the required switches and thereby the total switching requirement is very great, if the arrangement has a plurality of luminous cells.

The latter is often desirable, however, in order to obtain an indication with high resolution. An appreciable reduction of the number of the required switching components can be obtained by a coordinate feeding, in which the luminous cells are combined in successive groups, the exciting circuits of all luminous cells of one group are guided over a group switch and the exciting current circuits are connected together as to their position within the groups of corresponding luminous cells of all groups to an individual switch each.

With these and other objects in view which will become apparent in the following detailed description, the present invention will be clearly understood in connection with the accompanying drawings, in which.

Figure 1:
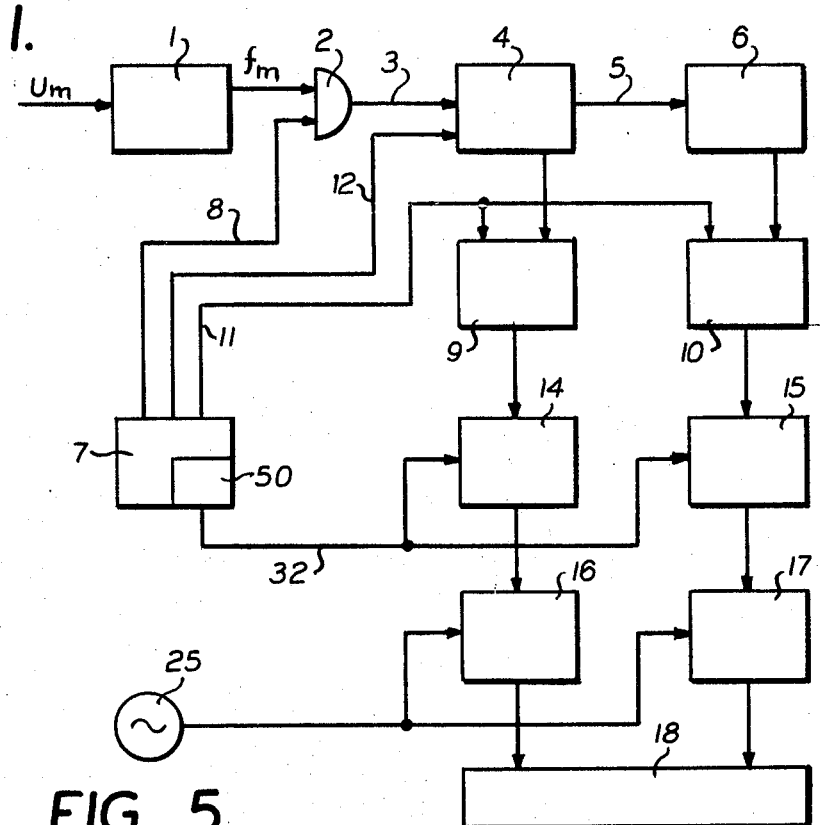
FIG. 1 is a block diagram of an indicating device designed in accordance with the present invention.
Figure 5:
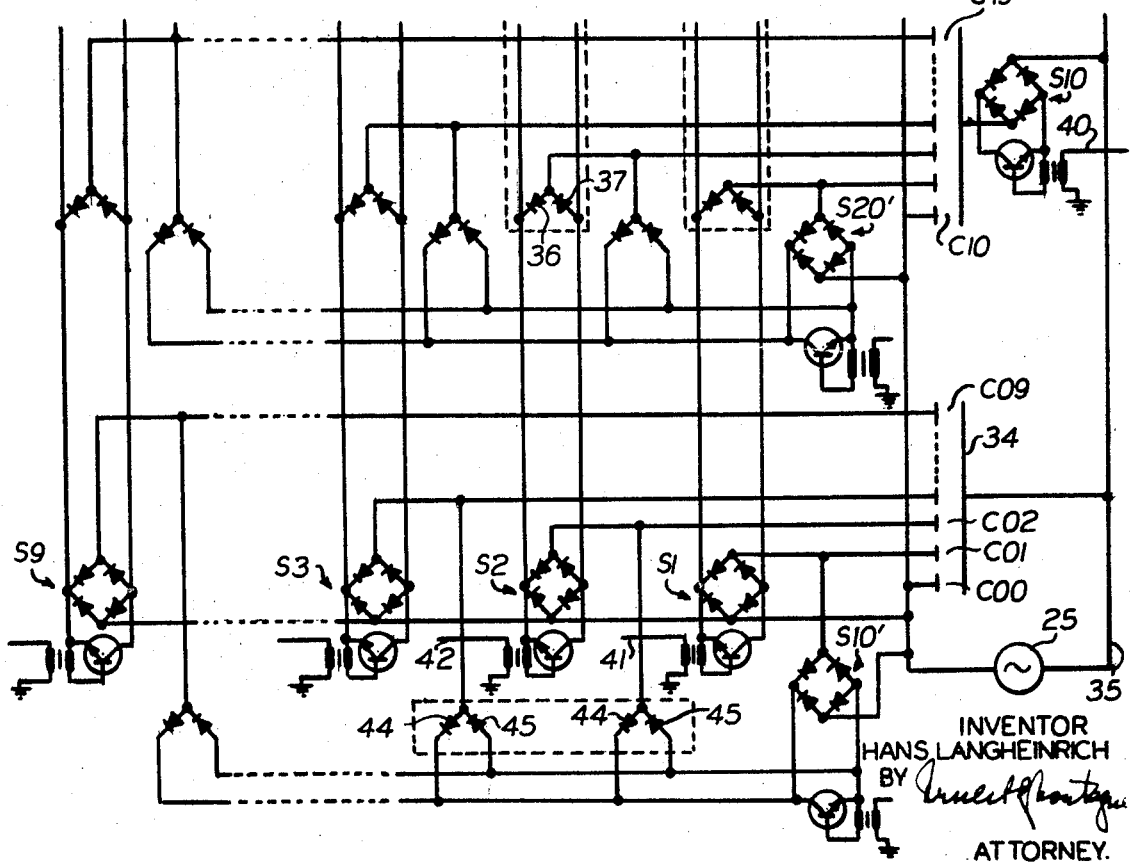
Figure 6:
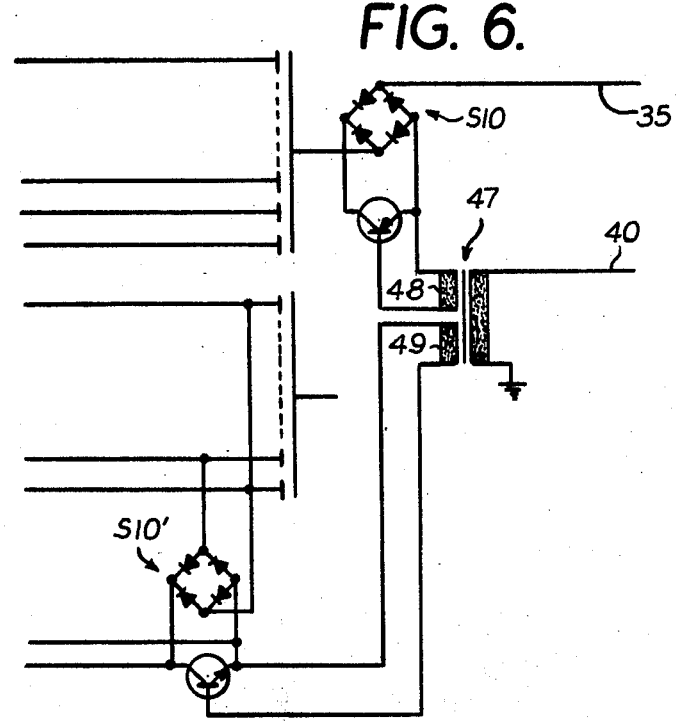
Figure 7:
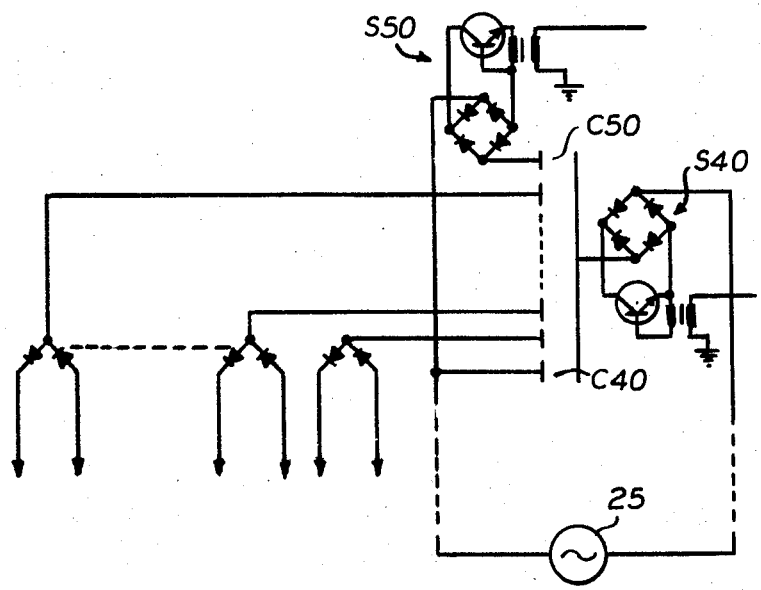

FIG. 5 discloses a diagram depicting the succession of the luminous cells and of the corresponding switches of the apparatus of FIG. 1;

FIG. 6 is a diagram depicting schematically the connection of the last luminous cell of the succession;

FIG. 7 discloses a diagram depicting the coordination of the 40 and 50 group cells.

Referring now to the drawings and in particular to FIG. 1, an input voltage $U_m$ analogous to the measuring value is transformed by means of a voltage-frequency-transformer 1 in a succession of pulses, the impulse follower frequency $f_m$ is proportional to the input voltage $U_m$. To the transformer 1 is connected an AND - gate 2, the output 3 of which is connected with a counter. The counter has a one-decade 4 and a ten-decade 6 connected with the former by means of a conduit 5. The counter 4 and 6 sums up the number of the output pulses of the transformer 1 within a pre-determined time measuring period. The constant measuring time is provided by a tact generator 7 which unlocks during the measuring time period the AND - gate 2 by means of conduit 8; the binary output signal of the counter 4 and 6 is given upon determination of the counting, to indicating storage members 9 and 10.

Transfer impulses, which cause the indication storage at the end of the counting procedure for receiving the state of the counter 4 and 6, are fed to the indicating storage members by means of the conduit 11 from the tact generator 7. Cancellation impulses, which are emitted from the tact generator 7 by means of a conduit 12 to the counter 4 and 6, cancel the counter after transmission of the state of the counter into the indication storage members 9 and 10 and prior to the start of a new counting procedure. The intermediate storing assures an extensive flicker-free indication.

A decoding step 14 follows the indications storage member 9 and a decoding step 15 follows the indicating storage member 10. The decoding steps 14 and 15 deliver the signals for the operation of a plurality of individual switches 16, as well as a plurality of group- and holding-switches 17. By means of the switches 16 and 17 luminous cells of a luminous cell succession 18 corresponding to the counter state stored in the indicator storage members 9 and 10 are chargeable with an exciting alternating voltage, which exciting alternating voltage is delivered from the voltage source 25.

Figure 2:
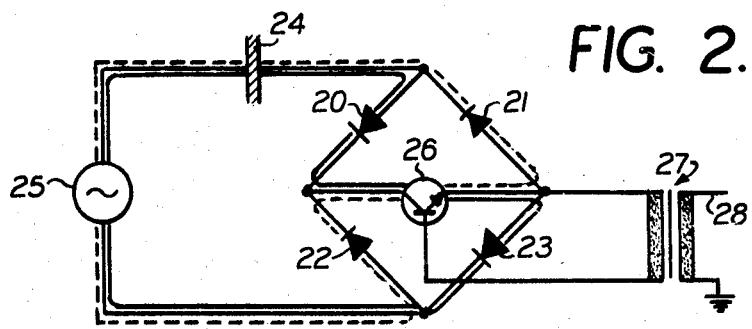
FIG. 2 is a schematic diagram of an electronic switch of the apparatus disclosed in FIG. 1.

The principal switching picture of an individual-, group- or holding-switch of the type designed in accordance with the present invention is shown in FIG. 2. The switch is a rectifier bridge with four diodes 20, 21, 22 and 23. In the alternating current path of the rectifier bridge is disposed a light cell in the form of an electro-luminescence element 24 in series with an exciting alternating voltage source 25. A transistor 26 is disposed with its emitter-collector-range in the direct current path of the rectifier bridge. If the base of the transistor 26 is disposed at a potential, which is equal to or lower than that of the emitter-potential, the transistor is locked. Thereby also the exciting alternating voltage is locked by means of the rectifier bridge 20, 21, 22, and 23 in both directions. A pre-illumination of the electro-luminescence element 24, which could occur with only one-sided locking of the exciting alternating voltage is prevented. If the base relative to the emitter has a positive potential, then the transistor 26 is conducting. The transistor short circuits the rectifier bridge. The electro-luminescence element 24 receives voltage and illuminates. The current flowing in the half waves of the exciting alternating voltage is indicated in FIG. 2 in full lines and in dotted lines, respectively. There it is to be recognized, that the rectifier bridge offers to the transistor the voltage always in the correct polarity, in spite of the fact, that the electro-luminescence element 24 is passed by alternating current. The shown electronic switch permits a safe locking in both directions, with a low control power high voltages.

For the connection of the switch, the emitter of the transistor 26 could be connected with the mass conduit of the feeding electronic and applied to the base feed of a control direct voltage. If, however, a plurality of switches are connected in this manner to the connecting electronic, all locked transistors are avoided during a half wave of the voltage at the exciting alternating voltage source 25 by means of the joint emitter connection, as long as only one of the transistors is conducting.

Accordingly, for this reason, the undesirable pre-illumination occurs again. In order to avoid this, in accordance with FIG. 2, the feeding of the electronic switch takes place free of potential by means of a transformer 27, the secondary winding of which is connected directly with the base and the emitter of the transistor 26. It has been found that, a rectifying on the secondary side and smoothing of the control alternating voltage fed over the control conduit 28 can be eliminated, if only the frequency of the connecting signal is sufficiently high. The transistor 26 is then alternately conducting and non-conducting. Since the electro-luminescence element 24 constitutes, however, a capacitive load, the voltage remains maintained in the short moment of the locking period. In the practice a frequency of the connecting signals of several 100 kHz has been found particularly suitable.

Figure 3:
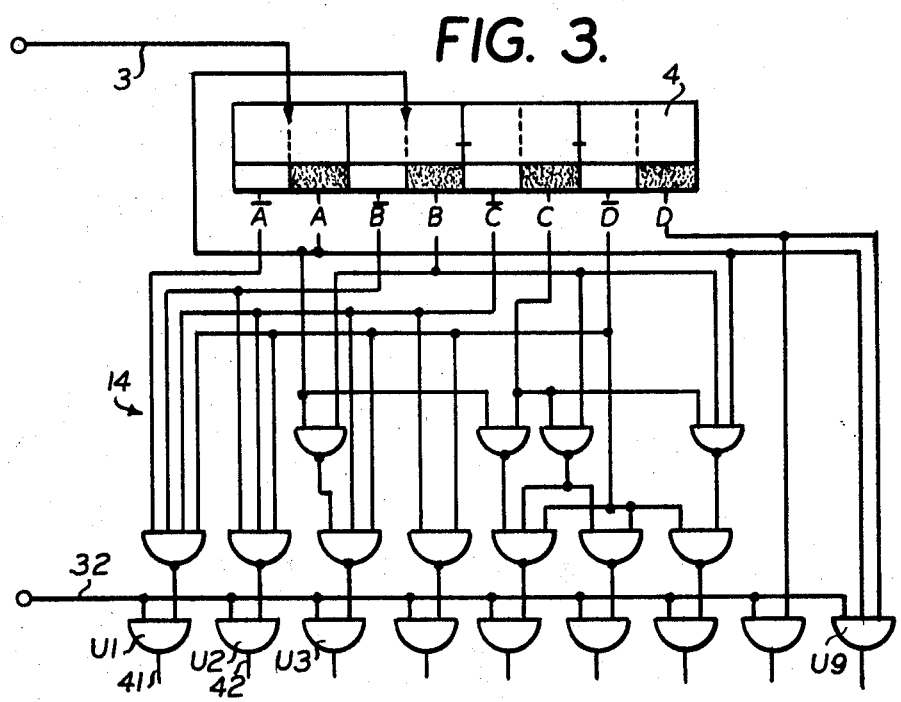
FIGS. 3 and 4 are one- and ten-decades of the apparatus as set forth in FIG. 1 in combination with the corresponding decoding steps.
Figure 4:
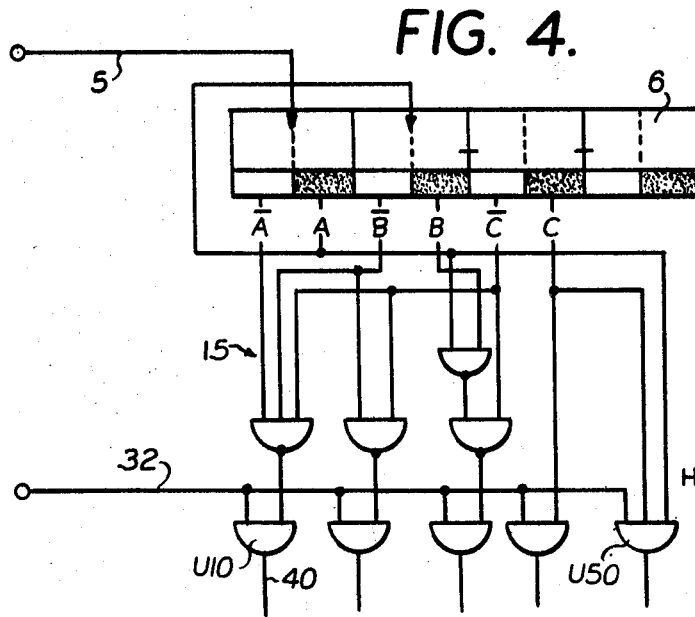

Details of a practical embodiment of the counter 4 and 6 and of the decoding steps 14 and 15 for a 50-part light band scale result from FIGS. 3 and 4, in which the indication storage member 9 and 10 have been omitted for the sake of simplicity of the showing. The counter 4 and 6 is designed as a BCD-counter with four flip-flops for each decade preferably of integrated switching circuits. The flip-flop outputs A to D of the one-decade 4 are interlocked with each other together such that at the output of that of the AND-gates $U_1$ to $U_9$ which correspond with the one-value of the counting result, a signal simultaneously occurs at the outputs of all AND-gate $U_1$ to $U_9$ of lower value. Or, for instance, six counter impulses have been injected into the one-decade 4, the AND-gate $U_1$ up to including $U_6$ are fed (logic L on the right input). Since the potential-free feeding of the switches 16 and 17 over the transformers 27 is required, no logic L, but rather the fast change between L and O is required, and a rectangular voltage of suitable frequency (several 100 kHz) is fed to the left input of the AND-gates $U_1$ to $U_9$ over a conduit 32 from a frequency generator 50 which, for instance, can be provided in the tact generator 7.

The recording step 15 for the ten-decade 6 is correspondingly built up. It is simplified relative to the decoding step 14 only by the fact, that in a 50-part indication the numbers 60, 70, 80 and 90 do not occur. Correspondingly only AND-gate U 10, U20, U30, U40 and U50 are present, the left input of which is likewise connected with the conduit 32.

Parts of the blocks 16, 17 and 18 of FIG. 1, that means of the succession of single-group- and holding-switches, as well as of the luminous cell succession, are shown in FIG. 5. As luminous cells are provided electro-luminescence elements C00 to C49, which are combined in five groups C00 to C09; C10 to C19 etc. Electro-luminescence elements constitute in principle a plate condensor, into the transparent dielectricum of which an illuminating material is embedded. The luminous material excitable by the electric alternating voltage source 25 emits light through one of the light transparent face electrodes of the elements. As can be ascertained from FIG. 5, the electro-luminescent elements of each group have a joint counter electrode. The counter electrode 34 of the first group C00 to C09 is directly connected to a conduit 35 leading to one side of the exciting alternating voltage source 25, while the counter electrodes of the remaining groups are in connection with the conduit 35 by means of group switches S10, S20, S30, S40 and S50, of which only the first one is shown.

The individual electrodes of the electro-luminescence elements of all groups corresponding which each other concerning their position within the groups are connected each to one of the individual switches S1 to S9. For instance, the individual electrodes of the electro-luminescence elements C02, C12, C22, C32, C42 are in connection with the individual switch S2.

The electro-luminescence element C02 is connected directly and the electro-luminescence elements C12, C22, C32 and C42 are connected over a pair of diodes 36, 37 switched over as a half bridge with the switch S2. The pair of diodes 36 and 37 prevent, the switch S2 from connecting the electro-luminescence elements C02, C12, etc., to C42, directly together when it is closed. Correspondingly letters apply also for the other individual switches. The connection of the group switches takes place from the outputs of the AND-gate U10 to U50 (FIG. 4), while the individual switches are fed from the outputs of the AND-gates U1, U9 (FIG. 3). For instance, the group switch S10 is connected with the AND-gate U10 over a conduit 40, and the group switches S1, S2 are connected with the AND-gates U1, U2 over conduits 41 and 42, respectively.

In the chosen type of decoding and feeding of the electro-luminescence elements, with the individual- and group-switches no coherent illumination band for counting values over would be obtained alone 9. If, for instance, in the counter the number 24 appears, thus 2 in the tenth decade and 4 in the one decade, deliver the AND-gates U1, U2, U3, U4, U10 and U 20 release feeding signals. By this arrangement only the electro-luminescence elements C00, C01, C02, C03, C04, C10, C11, C12, C13, C14, C20, C21, C22, C23 and C24 would illuminate. The intermediate electro-luminescence elements would remain dark and would constitute gaps. In order to avoid this, additional holding switches S10', S20', S30' and S40' are present, which cause, that upon feeding of a group switch in the tenth-groups there below all electro-luminescence elements are brought to illumination independently from the feeding of the individual switches. For example, during closing of the holding switch S10' all electro-luminescence elements C00 to C09 are light controlled. Half bridges or pairs of diodes 44 and 45, which correspond with pairs of diodes of the individual switches, for instance a pair of diodes 36 and 37, prevent a short circuiting of the electro-luminescence elements of a group independently from the switching state of the holding switch.

The holding switch S10' is fed jointly with the group switch S10, the holding switch S20' jointly with the group switch S20, etc. This can be performed, in accordance with FIG. 6, in such manner that transformers 47 are provided with two secondary windings of which one (48) is connected with the group switch, for instance S10, and the other with (49) with the coordinated holding switch, for example S10'.

In case of the counter state 24, mentioned above as example, now the group switches S10 and S20, the holding switches S10' and S20', as well as the individual switches S1, S2, S3 and S4 are fed. The holding switch S10' permits illumination of the electro-luminescence elements C01 to C09. Holding switches S20' and group switches S10 cause the illumination of the electro-luminescence elements C10 to C19. The group switches S20 and the individual switches S1, S2, S3, S4 permit the illumination of the electro-luminescence elementsC 20, C21, C22, C23 and C 24. The electro-luminescence element C00 illuminates steadily, as soon as the arrangement is in operation and constitutes the operation lamp.

The pair of diodes 36 and 37 and the pair of diodes 44 and 45, as indicated in FIG. 5 in dotted lines, are combined advantageously with adjacent pairs of diodes to complete diode bridges, which are available on the market.

In case up to number 50 inclusive should be indicated (so-called 2 percent indication), totally 51 luminous cells are required. The counter is arranged thereby preferably such, that the 50th impulse no longer reaches the one-decade 4, rather only the tenth decade 6 switches over for one step. Thereafter the counter is locked for further impulses. The last counter steps are then 47, 48, 49, 59. Only a cancellation of the counter (return to zero) makes possible a new counting movement. The luminous cell C50 can be coordinated in this case suitably to the 40-group and is fed with a single individual-switch S50 (FIG. 7). This type of the feeding has the advantage, compared with the basically likewise possible counting manner . . . 47, 48, 49, 50, that no additional holding switch S50' is present, because in the counter position 59 feeding signals on all AND-gate U1 to U9 and U10 to U50 occur. By locking of the counter upon reaching the highest provided counter value, it is avoided, that the counter in case of larger impulse numbers occurring within the measuring time period jumps back and starts again to count, whereby a false counting result would result.

It is to be understood that the present invention is not limited to the described embodiments. In the individual-, group- and/or holding- switches also thyristors or other electronic uni-directional-switching elements can be provided, instead of transistors. By correspondingly changed decoding, care can be taken, that always only one of the AND-gates U1 to U9 and at the most one of the AND-gates U10 to U50 releases a feeding signal and only the luminous cell corresponding with the counter value is light controlled, while the other luminous cells remain dark. In this case the holding switches are omitted. The total number of luminous cells is basically of choice. Instead of the voltage-frequency-transformer 1, a comparator can be used, which compares the measuring value signal periodically with a saw-tooth voltage increasing proportionally with the time, and in the after switched counter permits counter impulses with constant following frequency, during the time period, in which the measuring value signal is smaller than the saw-tooth voltage.

While I have disclosed several embodiments of the present invention, it is to be understood that these embodiments are given by example only and not in a limiting sense.

I claim:

1. An apparatus for analogue indication of measuring values, comprising
    a plurality of luminous cells, operatively connected in series with, and adapted to be excitable by, an alternating voltage source, and said plurality of luminous cells disposed to form a bargraph display, a plurality of electronic switches each operatively connected with said luminous cells, respectively, and operatively connected to apply said alternating voltage to said luminous cells, each of said switches comprises a rectifier bridge and a controlled uni-directional switch element having a source electrode being disposed in the direct current path of said rectifier bridge, said uni-directional switch element having a control electrode, said luminous cells being disposed in the alternating current path of said rectifier bridge, a transformer having a primary winding adapted to be fed with a high frequency control voltage, and said transformer having a secondary winding directly connected with said control electrode and said source electrode of said uni-directional switch element, whereby each uni-directional switch element controlled potential-free, and whereby when a uni-directional switch is in operation the corresponding electronic switch opens in both directions, and whereby the corresponding luminous cell has a flow of alternating current which is available through said uni-directional switch element during half waves in the correct polarity by the corresponding rectifier bridge, and whereby when said uni-directional switch element is off said exciting alternating voltage is blocked in both directions by said corresponding rectifier bridge.

2. An apparatus for analogue indication of measuring values comprising a plurality of luminous cells, operatively connected in series with, and excitable by, an alternating voltage source, and said plurality of luminous cells disposed to form a bargraph display, a plurality of electronic switches each operatively connected in series with said luminous cells, respectively, and said alternating voltage source and operatively connected to apply said alternating voltage source to said luminous cells, each of said switches comprises a rectifier diode bridge and a controlled uni-directional semiconducting switch being disposed in the direct current path of said diode bridge, and said luminous cells being disposed in the alternating current path of said diode bridge, whereby when a uni-directional semiconducting switch is in operation the corresponding electronic switch opens in both directions, and whereby the corresponding luminous cell has a flow of alternating current which is available through said uni-directional semiconducting switch during half waves in the correct polarity by the corresponding diode bridge, and whereby when said uni-directional semiconducting switch is off said exciting alternating voltage is blocked in both directions by said corresponding diode bridge.

3. The apparatus, as set forth in claim 2, wherein said uni-directional, semiconducting switch comprises a thyristor.

4. The apparatus, as set forth in claim 2, wherein said luminous cells comprise luminescence diodes.

5. The apparatus, as set forth in claim 2, further comprising voltage frequency means for transforming measuring valves into a succession of pulses, counter means for summing up the number of pulses within a predetermined measuring time period, storage means receiving signals from said counter means for the intermediate storage therein of the state of said counter means, and decoding means receiving signals from said storage means, operatively connected to said electronic switches, for providing signals for the operation of said electronic switches.

6. The apparatus, as set forth in claim 2, wherein said uni-directional semiconducting switch comprises a transistor.

7. The apparatus, as set forth in claim 2, wherein said luminous cells comprise electro luminescense elements.

8. The apparatus, as set forth in claim 2, further comprising a transformer, the operative connection of said uni-directional semiconducting switch takes place potential-free by means of said transformer connected to said uni-directional semiconducting switch, said transformer is fed with a high frequency feeding voltage, and said transformer has a secondary winding directly connected with a control electrode of said uni-directional semiconducting switch.

9. The apparatus, as set forth in claim 8, which includes a transformer with two secondary windings for simultaneous feeding of group switch and of holding switch.

10. The apparatus, as set forth in claim 2, which includes said luminous cells are combined in successive groups.

the exciting circuits of all said luminous cells of one group are guided by means of group switch, said exciting circuits are connected together with respect to their position within the groups of corresponding luminous cells of all groups to an individual switch each.

11. The apparatus, as set forth in claim 10, wherein said luminous cells coordinated to an individual switch are uncoupled from each other by means of a pair each of oppositely poled diodes.

12. The apparatus, as set forth in claim 10, wherein said luminous cells within each group have a common counter electrode.

13. The apparatus, as set forth in claim 10, which includes a counter-decade provided for the feeding of the group- and individual switches and is switched between said counter decade and the group- and individual decoding steps, and said decoding steps emit signals at the output corresponding with the measuring value and the outputs disposed therebelow as to value.

14. The apparatus, as set forth in claim 13, which includes an additional holding switch coordinated to predetermined luminous cell groups, and said luminous cells of said group are jointly excitable through said holding switch.

15. The apparatus, as set forth in claim 14, wherein said luminous cells coordinated to a holding switch are uncoupled together by means of a pair each of oppositely poled diodes.

16. The apparatus, as set forth in claim 14, which includes a series of luminous cells comprising 50 luminous cells fed from two counting decades of an electronic counter, and said counter is arranged such, that it passes over from one switching position directly into another switching position.

17. The apparatus, as set forth in claim 2, wherein the feeding of said unidirectional semiconducting switch takes place from a counter.

18. The apparatus, as set forth in claim 17, which includes an indicator storage member disposed between said counter and said switches.

19. The apparatus, as set forth in claim 17, wherein the input of said counter locks automatically upon receipt of the input signals corresponding with the maximum counter stand.

* * * * *